US007031929B1

(12) United States Patent
Button et al.

(10) Patent No.: US 7,031,929 B1
(45) Date of Patent: Apr. 18, 2006

(54) METHOD TO SUPPORT THE COORDINATION OF DISTRIBUTED PRODUCTION-PRINTING

(75) Inventors: Graham Button, Huntingdon (GB); Richard M. Bentley, Cambridge (GB); James Pycock, Huntingdon (GB)

(73) Assignee: Xerox Corporation, Stamford, CT (US)

( * ) Notice: Subject to any disclaimer, the term of this patent is extended or adjusted under 35 U.S.C. 154(b) by 842 days.

(21) Appl. No.: 09/707,926

(22) Filed: Nov. 8, 2000

(51) Int. Cl.
*G06Q 99/00* (2006.01)

(52) U.S. Cl. ........................................................ 705/8
(58) Field of Classification Search .................... 705/1, 705/8, 9, 11; 358/1.15, 296; 382/148; 399/81; 347/2; 370/359; 709/219
See application file for complete search history.

(56) References Cited

U.S. PATENT DOCUMENTS

| 4,527,885 | A | * | 7/1985 | Ayata et al. ..................... 347/2 |
| 4,982,234 | A | * | 1/1991 | Filion et al. ................... 399/81 |
| 4,984,234 | A | * | 1/1991 | Vergnaud et al. ........... 370/359 |
| 5,036,361 | A | * | 7/1991 | Filion et al. ................... 399/81 |
| 5,130,806 | A | * | 7/1992 | Reed et al. .................. 358/296 |
| 5,179,637 | A | * | 1/1993 | Nardozzi .................... 358/1.15 |
| 5,287,194 | A | * | 2/1994 | Lobiondo .................... 358/296 |
| 5,727,156 | A | * | 3/1998 | Herr-Hoyman et al. ...... 709/219 |
| 5,784,484 | A | * | 7/1998 | Umezawa .................... 382/148 |
| 5,813,348 | A | * | 9/1998 | Zingher ....................... 101/494 |
| 5,826,244 | A |   | 10/1998 | Huberman ..................... 705/37 |
| 5,842,178 | A | * | 11/1998 | Giovannoli ................... 705/26 |
| 6,078,906 | A |   | 6/2000 | Huberman ..................... 705/37 |
| 6,487,577 | B1 | * | 11/2002 | Sundararajan ............... 718/102 |
| 2002/0049733 | A1 | * | 4/2002 | Orlick ............................ 707/1 |

FOREIGN PATENT DOCUMENTS

JP 11-203082 A * 7/1999

OTHER PUBLICATIONS

The ins and the outs of electronic publishing. Matthew Wills and Gordon Wills, Journal of Business & Industrial Marketing, v11n1, pp: 90-104, 1996.*

* cited by examiner

*Primary Examiner*—Susanna M. Diaz

(57) ABSTRACT

The present invention provides a method to support the coordination of geographically distributed printing and, in particular, identification of possibilities for distributing print jobs to other shops for production. The technique involves the forwarding of production schedules by a number of print shops to a central location, where they are accessible to other print shops and can be used as a resource for identifying possible collaboration partners for distributed production. The technique builds on the common understanding and similar representation in the print industry of the production schedule, a device which charts the plan assignment of print job to particular machines for some future period. The novelty of the present invention lies in the sharing of production schedules through forwarding them to a central location in order to support the coordination of distributed production printing.

17 Claims, 4 Drawing Sheets

METHOD TO SUPPORT THE COORDINATION OF DISTRIBUTED PRODUCTION-PRINTING

BACKGROUND OF THE INVENTION

1. Field of the Invention

The present invention generally relates to Distributed Document Production (DDP), allowing print shops to transmit print job data to other print shops for off-site production, and in particular, to a technique for coordinating the processing of a print job by a plurality of print shops.

2. Description of the Related Art

Presently, the augmenting importance of electronic methods of submitting and managing print jobs, coupled with advances in reliable, high speed networks, increases the possibilities for more flexible management of production printing. In particular, such technology is enabling the development of distributed document production (DDP) solutions allowing print shops to transmit print job data to other print shops for off-site production. This is beneficial to the print shops in a number of ways, including:

a) Load balancing: Shops which would otherwise have to turn jobs away due to full capacity can now accept those jobs and have them produced elsewhere. Likewise, shops operating below capacity can solicit jobs from other print shops.

b) Print nearest customer: By having jobs produced nearer to the customer, shops can take advantage of low costs of distribution for the end product.

c) Access specialist services: Shops need not provide services, such as for example, advanced desktop publishing services, but can use other shops which do provide these services for all or part of the production of a job.

Although current technologies facilitate the distribution of electronic job data, print shops must first solve the problem of identifying who to partner with for any particular job. The range of potential partners may be large or may be unknown. To realize the benefits of DDP, shops require a rapid and efficient method of identifying potential collaborators on a job-by-job basis. For example, in the case of sending a job elsewhere, shops need to know which other shops currently have the facilities and spare capacity to produce the job to the required quality and to the contracted deadline.

In order to support the identification of collaboration partners for the purposes of DDP, several techniques have been developed up to now for providing a computer-based automatic scheduling system, where a central scheduling department or centralized scheduling system centrally controls the schedules of multiple shops and allocates jobs to whichever shop it decides is best suited. Respective commercial products are the "Logic Management Systems" produced by Logic Associates and the "Printer's Management System" produced by Hagen Systems.

Distributed scheduling applications (in which multiple, separate scheduling applications message each other) also exist where control of the allocation of jobs is delegated to computer systems, which treat the issue as one of resource allocation between separate entities. Such systems compute the optimum or the satisfactory using highly formulaic reasoning involving, for example, resolving constraint satisfaction problems. An example for this category is the "Zippin" research system produced by Xerox.

Another approach is that taken by document bid/broker-based systems, such as disclosed in U.S. Pat. Nos. 5,826,244 and 6,078,906. Such systems typically make the virtue of anonymity by focusing primarily on request and bids rather than requester and bidders. In contrast a human manager of a print shop will make decisions on accepting or declining print jobs on the basis of a range of criteria which are likely to be exceptionally difficult to formalize.

All conventional computer-based automatic scheduling systems have the drawback that they do not support local decision-making and control over print queues, but require multiple shops to give up local control of their schedules to a central unit, and that they do not allow human decision-making to an adequate extent.

SUMMARY OF THE INVENTION

The present invention has been made in consideration of the above situation, and has as its primary object to support distributed document production (DDP) and preserving at the same time a high degree of decentralization of decision-making and the possibility of human decision-making.

Another important object of the present invention is to provide a system whereby print shops are able to advertise for work by publishing their production schedules.

These and other objects of the present invention will become apparent hereinafter.

To achieve these objects, the present invention provides a technique to support the identification of collaboration partners for the purposes of DDP. The invention is based on the observation that production schedules are standard artifacts across the print industry. Such schedules map out the projected mapping of customer print jobs to particular print devices for a future period (typically several days). Although the schedules may be realized in different ways (e.g. a large piece of paper or a wall surface serving as a white board, or a cork board with pins and elastic bands), the basic representation is the same. This implies that the skills required to interpret such a representation are common across the production print industry.

To support the identification of collaboration partners, the invention concerns a forwarding of print shops' production schedules to a central repository. This forwarding may be automated periodically or manually controlled. The repository is accessible to personnel from other print shops who can browse the published schedules to identify shops that have spare capacity, in the appropriate time frame and on the appropriate print devices, to partner with in producing a print job.

According to a second aspect of the present invention, access controls are provided to limit the visibility of production schedules to particular print shops and/or personnel. This implies the existence of a user identification and access control mechanism as part of the central repository. In this context, it may be possible for print shops to publish multiple representations of the production schedules, at different levels of detail and restrict the access to anyone representation.

According to another aspect of the invention, filtering and categorization mechanisms for production schedules are provided. For example, attached to their user profiles, print shops may have modifiable sets of preferred collaborators and receive a filtered display of only those collaborators' production schedules when they access the central repository.

Additionally or alternatively, schedules might be grouped according to the geographic region in which each shop falls or by the types of services, the shops offer.

BRIEF DESCRIPTION OF THE DRAWINGS

The accompanying drawings are incorporated into and form a part of the specification to illustrate several embodiments of the present invention. These drawings, together with the description, serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION

The illustrated embodiments of the present invention will now be described with reference to the figure drawings.

Figure 1:
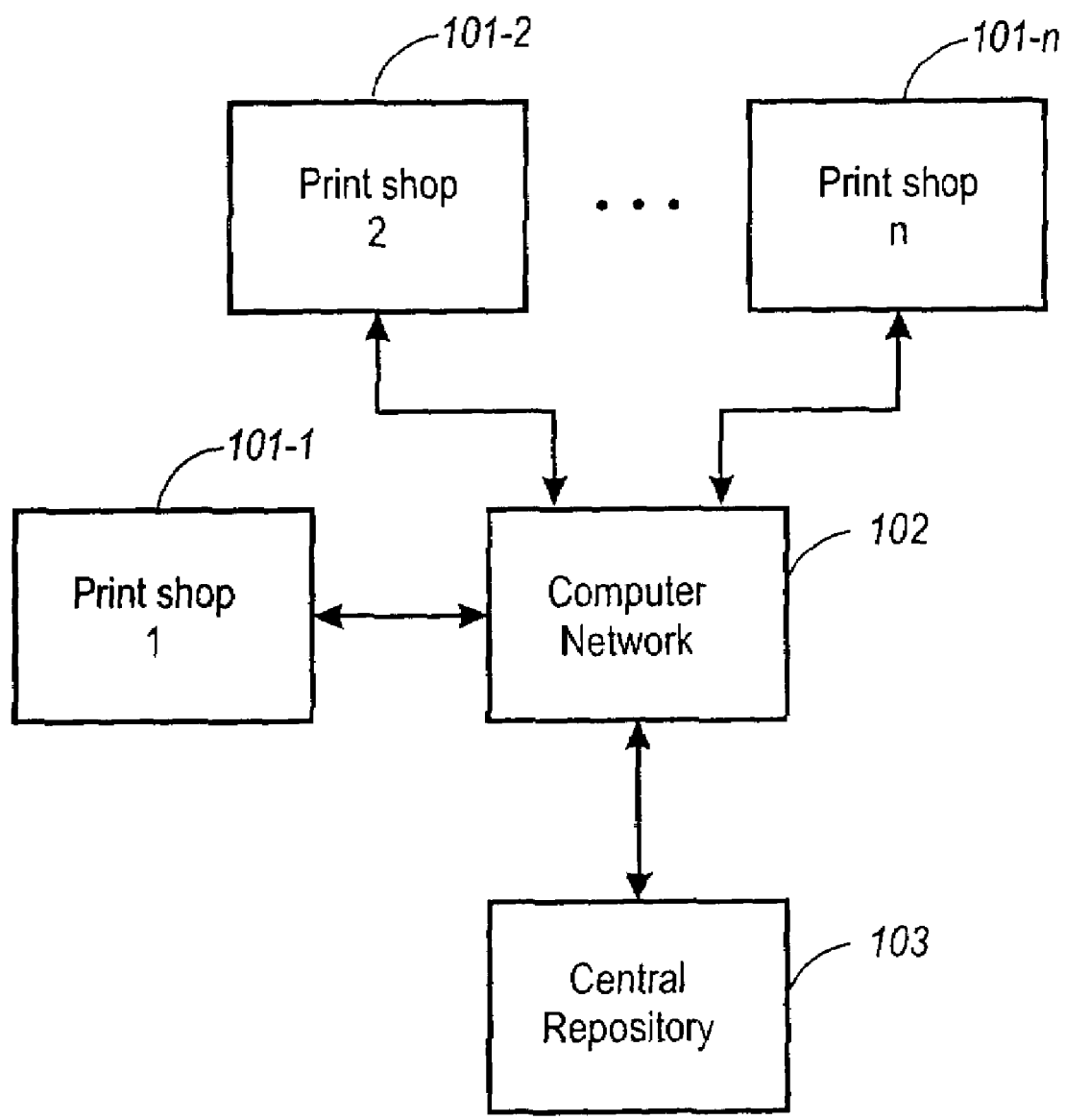
FIG. 1 illustrates a system of multiple print shops which are connected via a computer network to a central repository.

Referring now to the drawings and particularly to FIG. 1 which illustrates a preferred embodiment of a system of multiple print shops which are connected via a computer network to a central repository, there is provided one first print shop 101-1 that is connected to several second print shops 101-2 to 101-n via a computer network 102. The computer network 102 enables the exchange of data between a central repository 103 and the first and second print shops 101-1 to 101-n. Each print shop 101-1 to 101-n forwards data to the central repository 103, which represents the respective production schedule of the print shop and allows a graphical display of the same. In case that, for instance, print shop 101-1 lack sufficient printing capacity for processing a particular print job, it can receive the data representing the production schedules of print shops 101-2 to 101-n from the central repository 103 via the computer network 102 and can display the same in a graphical way.

Figure 2:
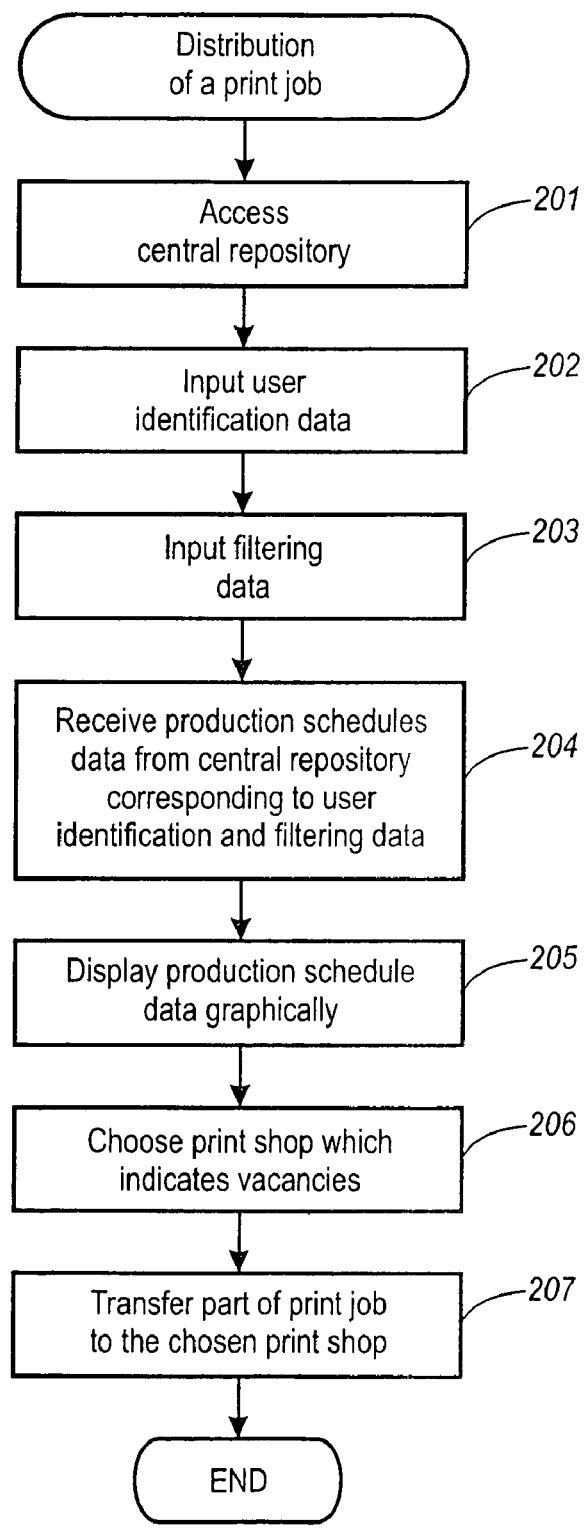
FIG. 2 illustrates a flow chart of the distribution of print jobs.

Turning now to FIG. 2, which illustrates the flowchart of the distribution of print jobs, the procedure of processing a particular print job can be explained in more detail.

In step 201 the first print shop 101-1 accesses via the computer network 102 the central repository 103. The requesting print shop 101-1 inputs its user identification data in step 202. By means of such an optional access control, the visibility of production schedules can be limited to particular print shops and/or personnel. This implies the existence of a user identification and access control mechanism as part of the central repository 103. Also optionally, it may be possible for print shops to publish multiple representations of their production schedules at different levels of detail and restrict access to anyone of the representations. This last facility might, for example, be useful to provide a detailed representation of the production schedule, perhaps containing details of customer deadlines for jobs as well as their planned completion dates accessible to some preferred potential collaborators, while providing a basic representation for more general consumption.

In step 203 the requesting print shop 101-1 can input filtering data, if filtering and categorization mechanisms for the production schedules are provided. For example, attached to their "user profiles", print shops may have modifiable sets of "preferred collaborators" and receive a filtered display of only those collaborators' production schedule when they access the central repository 103. Additionally or alternatively, production schedules might be grouped according to the geographic region in which the shop falls, or perhaps by the types of services the shops offer.

As shown in step 204, the first print shop 101-1 now receives production schedule data from the central repository 103 corresponding to the input user identification and filtering data. These data can be used to display the production schedules graphically, as indicated by step 205. On the basis of the displayed production schedule data, one of the second print shops 101-2 to 101-n can be chosen which indicates the necessary vacancies and/or fulfils other important criteria.

Finally, print shop 101-1 transfers in step 207 all or part of the print job to the chosen print shop.

Figure 3:
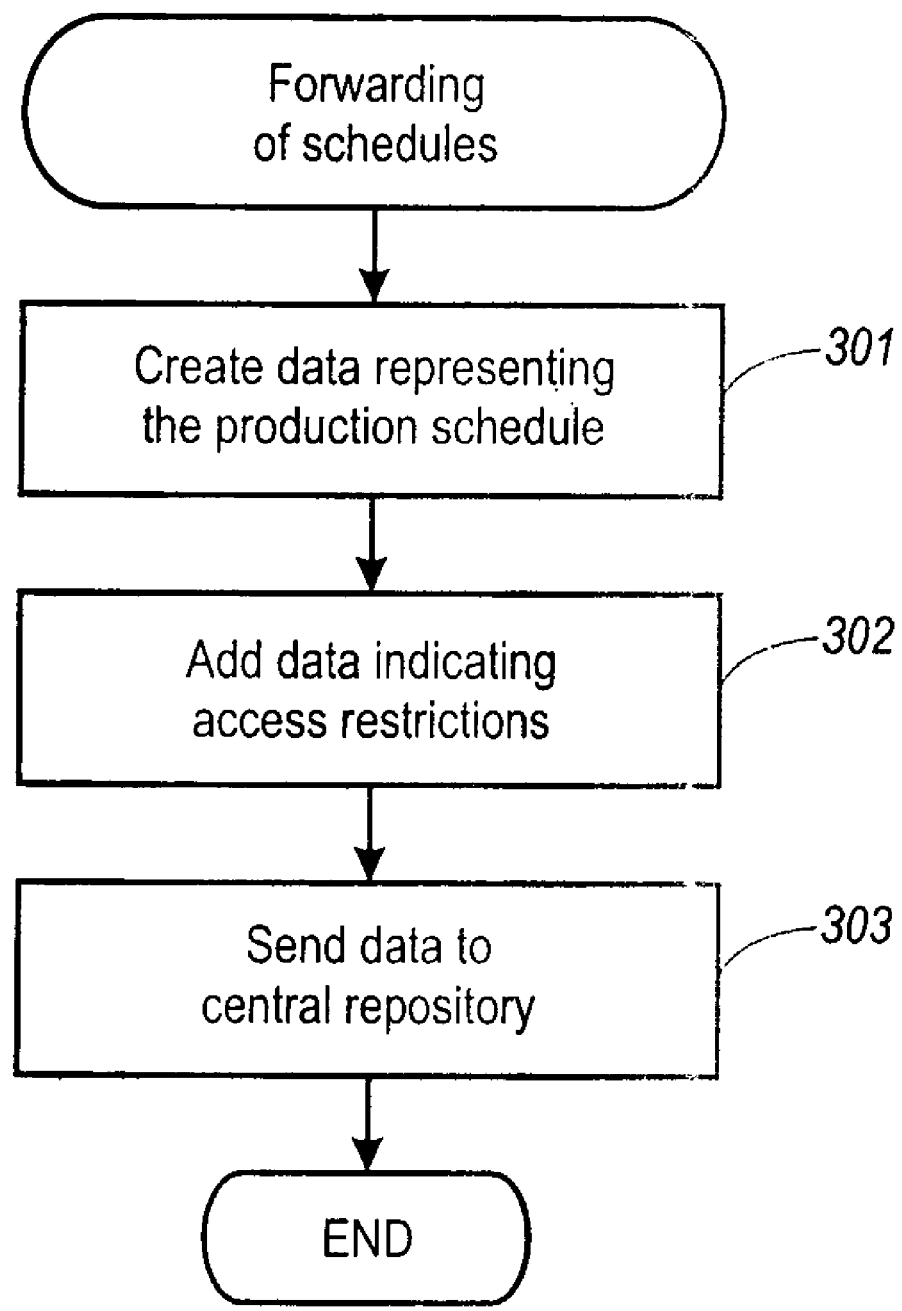
FIG. 3 illustrates a flow chard on how production schedules are forwarded to the central repository.

FIG. 3 illustrates the procedure of forwarding production schedules. In a first step 301, computer readable data have to be created representing the production schedule of a print shop. Many schedules in print shops are not computer-based, but they are highly visual. Many act primarily as an aide memory for human schedulers to record and display their scheduling decisions. When focusing on local decision-making by human managers, the production schedule has to be provided in a human readable rendering. It is a secondary concern that this rendering should be in addition processable by a computer application. The human readable rendering can thus be derived from a number of sources. It can be produced by a computer-based scheduling application, but it could also be provided as an image captured from a paper scanner or video camera for a wall-mounted display.

Consequently, there is no requirement on the print shops to use the same scheduling tool.

This approach contrasts with approaches based on data exchange between computers for the purpose of data processing, recognizing that the visual display of scheduling information is primary on any need to support computer processing of the data elements of a schedule.

In step 302, optionally, data can be added which indicate access restrictions. In the last step 303 the data are sent to the central repository 103 via the computer network 102.

Figure 4:
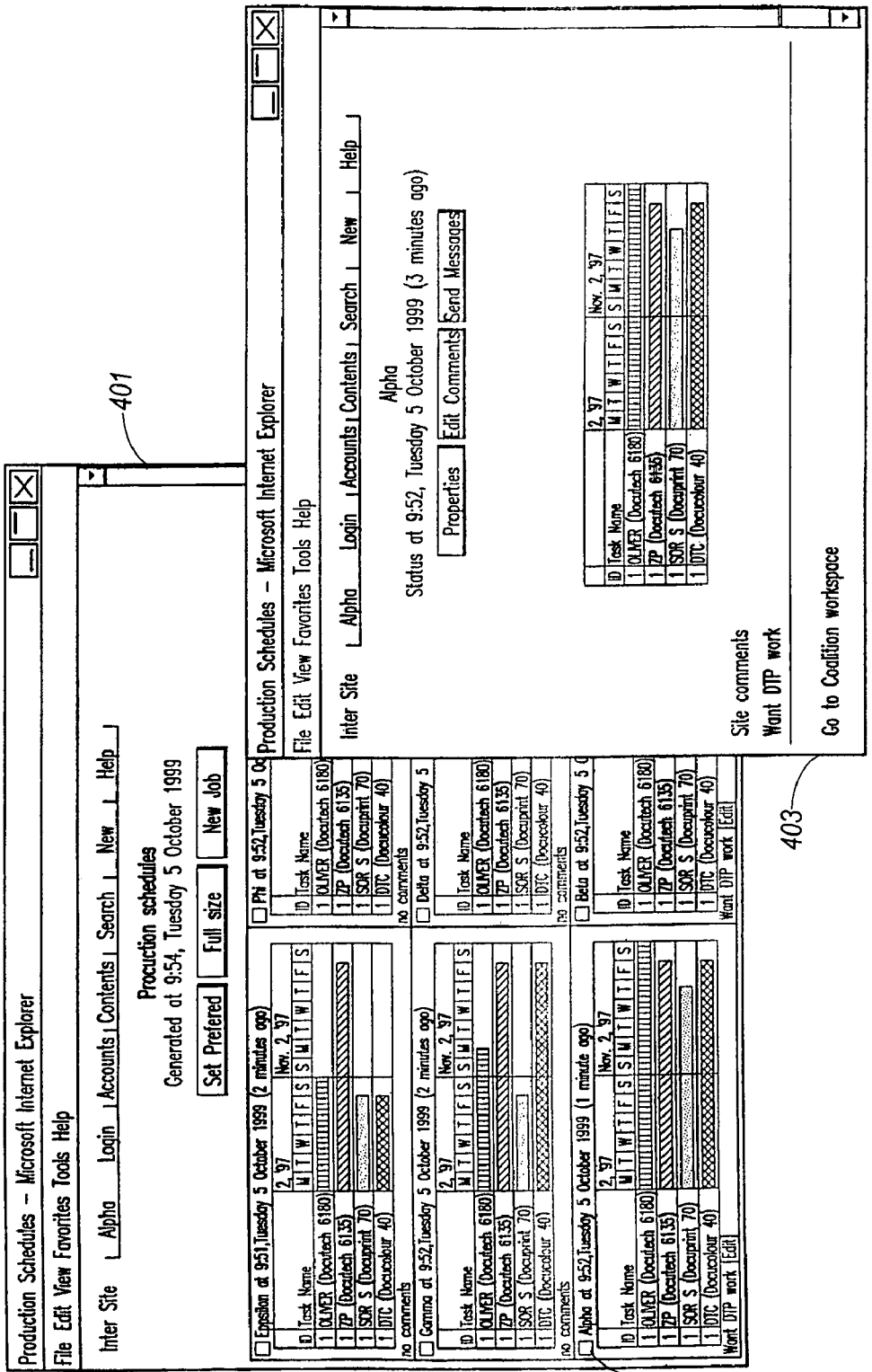
FIG. 4 illustrates a preferred embodiment of the production schedules display.

A specific example of a preferred embodiment of the present invention can be described in greater detail with reference to FIG. 4. This preferred embodiment of the invention is its implementation in an extension of Xerox's DocuShare system called "InterSite", which provides a centrally accessible repository for production schedules plus a macro script extension to Microsoft Project which demonstrates the publication of the schedules to the central repository.

Individual print shop 101-1 to 101-n are represented as DocuShare users, each having a login consisting of a user name and password. On logging in to DocuShare using a standard web browser, print shop users are able to access a forward loading board display 401. This display provides so-called thumbnail images of each participating print shops' published production schedules along with information on when the schedule was last published. To reduce possible information overload with a large number of print shop schedules, an editable list of "preferred shops" can be associated with each user profile and use at the user's request as a filter to show only those schedules of preferred print shop partners. The thumbnail display 401 is intended to give the first idea of which shops may have appropriate spare capacity. Clicking on a thumbnail of a schedule at button 402 opens a new window 403 which gives a larger, more detailed representation. In this more detailed display any additional comments provided by the print shop are also available. Shops might use this facility to proactively solicit work, should they foresee possible underutilization of particular machines or services based on the orders they currently hold.

Note that it is not necessary to make this separation into thumbnail display 401 and detail displays 403 in order to realize the invention. More sophisticated interface realizations, for example, not restricted to the HTML interfaces with embodiment for rendering in a web browser might provide very different production schedules.

To forward a production schedule to InterSite requires uploading a representation of the schedule to the DocuShare server. A publishing interface is defined and implemented as an extension to DocuShare, which specifies the format in which the schedule representation should be uploaded. This is a simple extension to DocuShare's RFC822 Mime-multipart method of file upload. At the minimum, the publishing interface requires than an image (for instance, GIF or JPEG) representation of the schedule should be uploaded as the InterSite is based on displaying the schedules in a web browser.

The publishing interface does not constrain in any way how the image representation of the schedule is produced and what it contains. It is therefore possible to conceive of interfacing InterSite to a range of commercial scheduling tools which produce different schedule formats as well as more radical methods, for example, using a video camera to take images from a wall-mounted, forward-loading board. For the InterSite prototype, a concrete realization using Microsoft Project as an example scheduling application was developed. Support for publishing project schedules to InterSite (as GIF images) was developed using the Project applications macro-extension capabilities which interface to a DocuShare file uploader program to package and send the image file to the DocuShare server.

This explicit publication approach would allow print shops to control exactly what information on their production status is made available to others and how frequently. This idea is taken further in InterSite as the publication interface supports the publication of multiple representations of the same production schedule. Using DocuShare's simple access control features, it is possible to limit access to each representation of the schedule to a subset of the print shop users. To demonstrate this as well as the basic GIF image format, the Microsoft Project macro also publishes the project data file representation of the schedule. The source data file contains more information on the scheduled jobs, such as required as well as planned job completion dates. By clicking on the schedule image on button 402 print shop users that have been granted the necessary access permission can download and view the project data file instead.

While the invention has been described with respect to the preferred physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order not to obscure unnecessarily the invention described herein. Accordingly, it is to be understood that the invention is not to be limited by the specific illustrated embodiment, but only by the scope of the appended claims.

The invention claimed is:

1. A computer implemented method for processing a print job with geographically distributed print shops, comprising:
    coupling a first set of print shops, a second set of print shops, and a central repository via a computer network; the first set of print shops having one print shop and the second set of print shops having a plurality of print shops;
    sending to the central repository a production schedule representative of at least one print shop in the second set of print shops with access controls that allow visibility of its production schedule to include the print shop in the first set of print shops; each production schedule sent by a print shop to the central repository comprising data allowing a representation for graphically displaying the respective production schedule;
    retrieving, at the print shop in the first set of print shops from the central repository via the computer network when the print shop in the first set of print shops lacks sufficient printing capacity for processing the print job, the production schedules of print shops in the second set of print shops having access controls that permit visibility of their production schedules to the print shop in the first set of print shops; and
    transferring, from the print shop in the first set of print shops to at least one print shop in the second set of print shops via the computer network, at least part of the print job when spare printing capacity is indicated in at least one retrieved production schedule of the second set of print shops;
    wherein the production schedule data is created suitable for storage in the central repository by capturing an image of a human readable rendering of the production schedule;
    wherein the print shop in the first set of print shops and the at least one print shop in the second set of print shops effect the transfer of the at least part of the print job independent of any centralized scheduling application while each print shop may operate a scheduling application of its choosing; and
    wherein each production schedule projects a mapping between print jobs and print devices over a period of time.

2. The computer implemented method according to claim 1, wherein the print shop in the first set of print shops graphically displays the production schedules of the second set of print shops retrieved from the central repository.

3. The computer implemented method according to claim 2, wherein each of the print shops in the second set of print shops sends its respective production schedule to the central repository.

4. The computer implemented method according to claim 2, wherein at least some of the production schedules of the print shops in the second set of print shops are created from a digitized photograph of a hard copy rendering of their production schedules.

5. The computer implemented method according to claim 1, further comprising limiting the production schedules of the print shops in the second set of print shops retrieved by the print shop in the first set of print shops from the central repository as a function of geographical location of the print shop in the first set of print shops and the print shops in the second set of print shops.

6. The computer implemented method according to claim 1, further comprising creating production schedule data suitable for a storage in the central repository with a computer-aided scheduling tool.

7. The computer implemented method according to claim 1, wherein the image of the human readable rendering of the production schedule is captured using a scanner or camera.

8. The computer implemented method according to claim 1, wherein the production schedule is delivered from the central repository to the first print shop only in cases that the first print shop satisfies access conditions which are defined by the plurality of print shops.

9. The computer implemented method according to claim 1, wherein said retrieving, at the print shop in the first set of print shops from the central repository via the computer network when the print shop in the first set of print shops lacks sufficient printing capacity for processing the print job, filters the retrieved production schedules of print shops in the second set of print shops.

10. The computer implemented method according to claim 9, wherein the first set of print shops only displays production schedules of the second set of print shops which are located within a pre-defined geographical region.

11. The computer implemented method according to claim 9, wherein the first set of print shops only displays production schedules of the second set of print shops which belong to a pre-defined group of preferred print shops.

12. The computer implemented method according to claim 1, wherein said sending sends to the central repository a production schedule representative of different levels of detail of at least one print shop in the second set of print shops with access controls that allow visibility of at least one of the different levels of detail of its production schedule to include the print shop in the first set of print shops.

13. The computer implemented method according to claim 12, wherein one level of detail of the production schedule includes details of customer deadlines for print jobs.

14. The computer implemented method according to claim 12, wherein one level of detail is a thumbnail representation of the production schedule.

15. The computer implemented method according to claim 1, wherein the period of time each production schedule projects a mapping between print jobs and print devices is a plurality of days.

16. The computer implemented method according to claim 1, further comprising recording an image of a human readable rendering of the production schedule before sending it to the central repository.

17. A computer implemented method for processing a print job with geographically distributed print shops, comprising:

coupling a first set of print shops, a second set of print shops, and a central repository via a computer network: the first set of print shops having one print shop and the second set of print shops having a plurality of print shops;

sending to the central repository a production schedule representative of at least one print shop in the second set of print shops with access controls that allow visibility of its production schedule to include the print shop in the first set of print shops; each production schedule sent by a print shop to the central repository comprising data allowing a representation for graphically displaying the respective production schedule;

retrieving, at the print shop in the first set of print shops from the central repository via the computer network when the print shop in the first set of print shops lacks sufficient printing capacity for processing the print job, the production schedules of Print shops in the second set of print shops having access controls that permit visibility of their production schedules to the print shop in the first set of print shops;

limiting the production schedules of the print shops in the second set of print shops retrieved by the print shop in the first set of print shops from the central repository as a function of (a) a user profile that is attached to the print shop in the first set of print shops and that defines a set of preferred print shops from the second set of print shops and (b) geographical location of the print shop in the first set of print shops and the print shops in the second set of print shops; and transferring, from the print shop in the first set of print shops to at least one print shop in the second set of Print shops via the computer network, at least part of the print job when snare printing capacity is indicated in at least one retrieved production schedule of the second set of print shops;

wherein the print shop in the first set of print shops and the at least one print shop in the second set of print shops effect the transfer of the at least part of the print job independent of any centralized scheduling application while each print shop may operate a scheduling application of its choosing;

wherein each production schedule projects a mapping between print jobs and print devices over a period of time.

* * * * *